J. N. KEYSER & G. TOPHAM.
BASKET.
APPLICATION FILED JULY 26, 1911.
1,020,290.
Patented Mar. 12, 1912.
3 SHEETS—SHEET 1.
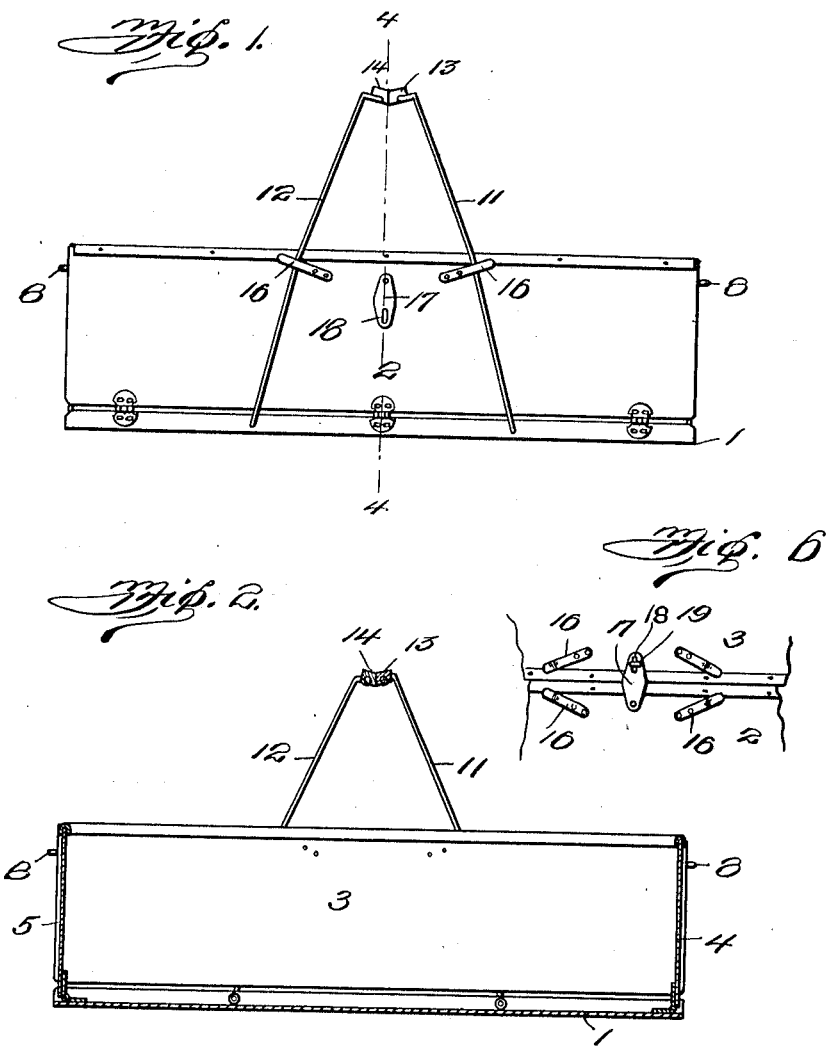
WITNESSES
INVENTORS
John N. Keyser
George Topham.
By Edgar M. Kitchin, Attorney

J. N. KEYSER & G. TOPHAM.
BASKET.
APPLICATION FILED JULY 26, 1911.

1,020,290.

Patented Mar. 12, 1912.
3 SHEETS—SHEET 2.

WITNESSES

INVENTORS
John N. Keyser
George Topham,
By Edgar M. Kitchin Attorney.

J. N. KEYSER & G. TOPHAM.
BASKET.
APPLICATION FILED JULY 26, 1911.
1,020,290.
Patented Mar. 12, 1912.
3 SHEETS—SHEET 3.
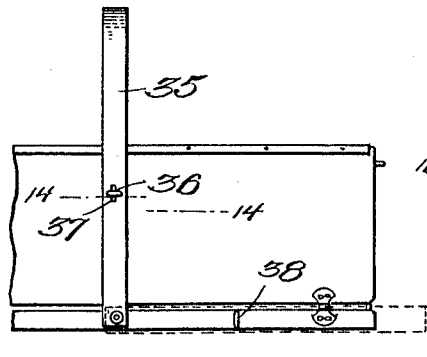
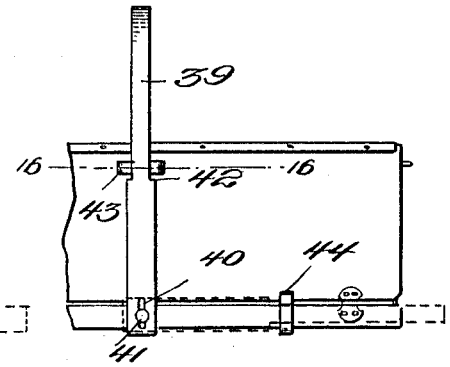
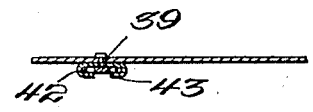
Witnesses
G. F. Tolson.
Ewt Briggs.
Inventors
John N. Keyser,
George Topham
By Edgar M. Kitchin
their Attorney

UNITED STATES PATENT OFFICE.

JOHN N. KEYSER AND GEORGE TOPHAM, OF WASHINGTON, DISTRICT OF COLUMBIA.

BASKET.

1,020,290.  Specification of Letters Patent.  Patented Mar. 12, 1912.

Application filed July 26, 1911. Serial No. 640,719.

*To all whom it may concern:*

Be it known that we, JOHN N. KEYSER and GEORGE TOPHAM, citizens of the United States, residing at Washington, in the District of Columbia, have invented certain new and useful Improvements in Baskets; and we do hereby declare the following to be a full, clear, and exact description of the invention, such as will enable others skilled in the art to which it appertains to make and use the same.

This invention relates to improvements in baskets or containers, and more particularly to that class known as folding or collapsible baskets and has for its principal object to provide a basket with folding side and end sections so that it may be folded to a comparatively small size when not in use.

Another object of the invention is to provide a basket of the class described which has a handle to be used when the basket is either open or folded.

A further object of the invention is to provide a basket which has all the uses of an ordinary basket and from a money saving standpoint can be shipped or handled at less cost than the ordinary basket in use.

A still further object of the invention is to provide a basket of this class which can be substituted for the ordinary basket in use and at the same time prove inexpensive to manufacture.

With these and other objects in view the invention consists in the construction and novel combination of parts hereinafter fully described, illustrated in the accompanying drawings and pointed out in the claims hereto appended, it being understood that various changes in the proportion, size, minor details of construction, and the substitution of different materials within the scope of the claims, may be resorted to without departing from the spirit or sacrificing any of the advantages of the invention.

Figure 3:
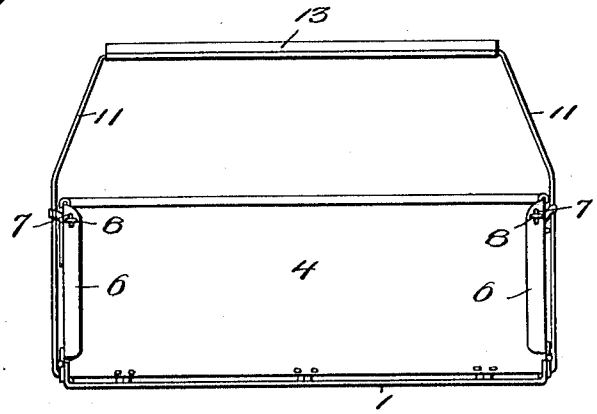
Figure 4:
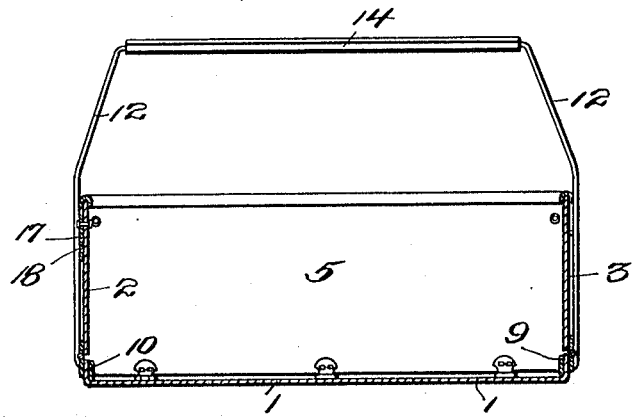
Figure 5:
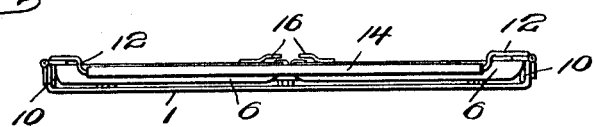

Referring to the drawings forming a part of these specifications—Figure 1 is a side elevation of a basket constructed in accordance with our invention showing same in an open position. Fig. 2 is a longitudinal section through same. Fig. 3 is an end view. Fig. 4 is a cross section taken on the line 4 of Fig. 1. Fig. 5 is an elevation showing the basket in folded position. Fig. 6 is a fragmentary top plan view taken when basket is closed showing locking means. Fig. 7 is an enlarged sectional view showing construction of handle. Fig. 8 is a side view of a modified form of handle. Fig. 9 is a sectional view taken on line 14—14 of Fig. 8. Fig. 10 is a side view of another modification, and Fig. 11 is a sectional view taken on line 16—16 of Fig. 10.

Like reference numerals designate corresponding parts in all the figures of the drawings.

Referring to the drawings, 1 indicates the bottom having hinged thereto the side sections 2 and 3 and the two end sections 4 and 5. The side sections have on each end inwardly turned flaps 6 in which are formed slots or eyes 7 designed to receive the turn buttons 8 of end sections 4 and 5 when the basket is in the open position. The buttons 8 are rotatably mounted in end sections 4 and 5 and by being turned after passing through slots 7 serve as locking means. The bottom section 1 has upturned edges and is reinforced by the strips 9 and 10 on both sides which insure against strain on the bottom. The bail-like handles are preferably formed of relatively rigid wires 11 and 12, and are covered by strips 13 and 14 to present a broad carrying surface and to thus render the handles convenient for use. The strips 13 and 14 are secured to the wire handles by means of small staples 15. To obviate any play when the basket is open, the metal spring brackets or clamps 16 are secured on side sections 2 and 3 and form detents for handles 11 and 12. To securely lock the parts of the basket when in their folded position, we employ a metal or leather tab 17 pivotally fastened to side section 2. The tab 17 has in one end a slot 18 which is designed to receive turn button 19 on side section 3, as is clearly shown in Fig. 6.

In the modification shown in Figs. 8 and 9 is the single handle 35 pivotally connected to the bottom section and, as a locking means, the turn button 36 is rotatably mounted on the side section to engage slot 37 in the handle, when in an unfolded position. In a folded or collapsed position, as shown in dotted lines, the turn button 38, which is pivoted to the bottom section, is designed to pass through slot 37 and lock the handle in its folded position.

In Figs. 10 and 11, the handle 39 is slidably mounted by means of slot 40 and pin 41. The handle is reduced as at 42 to form a shoulder, which when the handle is lifted enters the hooked shaped bracket 43 and is prevented from play. An additional bracket or hook 44 is designed to engage the handle when the basket is folded or collapsed. As shown in Fig. 8, handle 35, when the basket is folded, assumes the position shown in dotted lines and serves as a handle for carrying the collapsed structure.

What we claim is:

1. In a basket, the combination of a bottom, collapsible sides and ends connected thereto, a bail-like handle pivotally connected to the bottom and adapted to swing to an accessible position for use when collapsed, and means for locking the handle either in its collapsed or unfolded position for sustaining the bottom and sides.

2. In a folding basket, a bottom, sides and ends hinged thereto and adapted to be folded from an upright position to a relatively flat position over the bottom, and a pivoted bail-like handle pivoted to the bottom and adapted to swing from an upright position to a position substantially longitudinally of the bottom and exposed to be accessible for use when folded, and means for retaining the handle in its folded and unfolded positions.

3. In a basket, the combination of a basket body comprising collapsible parts, and a substantially rigid bail-shaped handle pivotally connected at its ends to the bottom of the basket body and lying outside thereof, in position for at all times being accessible for use as a handle, the said handle being adapted to be swung on its pivots to and from a collapsed condition and when collapsed lying substantially within the planes of the collapsed body portion.

4. In a folding basket, a bottom, sides and ends hinged thereto and adapted to be folded from an upright position to a relatively flat position over the bottom, and a bail-like handle pivoted to the bottom and adapted to swing from an upright position to a position substantially longitudinal of the bottom and exposed to be accessible for use when folded, and means for locking all of the parts both in their folded and unfolded position.

5. In a folding basket, the combination of a bottom, sides and ends pivotally connected to collapse on the bottom, and a handle pivoted to the bottom outside of said collapsible parts and adapted to swing from a substantially upright position to a position substantially horizontal, means for detachably retaining the handle in its horizontal position, and means for detachably retaining the handle in its upright position.

6. In a basket, the combination of a bottom, sides and ends pivotally connected and adapted to collapse on the bottom, and a substantially rigid handle outside of said collapsible parts and pivotally connected to the bottom and adapted to swing from a substantially upright to a substantially horizontal position relative to the bottom.

In testimony whereof we affix our signatures in presence of two witnesses.

JOHN N. KEYSER.
GEORGE TOPHAM.

Witnesses:
GROVER F. TOLSON,
J. F. KELLEY.

---

Copies of this patent may be obtained for five cents each, by addressing the "Commissioner of Patents, Washington, D. C."